United States Patent
Shioda et al.

(10) Patent No.: US 6,977,997 B2
(45) Date of Patent: Dec. 20, 2005

(54) TELEPHONE COMMUNICATION SYSTEM AND METHOD, AND SERVER FOR PROVIDING ADVERTISEMENT INFORMATION

(75) Inventors: Takehiko Shioda, Tsurugashima (JP); Yukitaka Saito, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 131 days.

(21) Appl. No.: 09/971,110

(22) Filed: Oct. 5, 2001

(65) Prior Publication Data
US 2002/0044639 A1    Apr. 18, 2002

(30) Foreign Application Priority Data
Oct. 12, 2000    (JP) ............................. 2000-311637

(51) Int. Cl.[7] ........................................... H04M 15/00
(52) U.S. Cl. .............................. 379/114.13; 379/93.12; 379/114.05
(58) Field of Search ..................... 379/93.12, 114.05, 379/114.13

(56) References Cited

U.S. PATENT DOCUMENTS

| | | | |
|---|---|---|---|
| 4,850,007 A | * | 7/1989 | Marino et al. ................. 379/67 |
| 5,557,658 A | * | 9/1996 | Gregorek et al. ............. 379/67 |
| 5,610,973 A | * | 3/1997 | Comer ......................... 455/413 |
| 5,652,784 A | | 7/1997 | Blen et al. .................. 379/67.1 |
| 6,154,528 A | * | 11/2000 | Bennett et al. .......... 379/93.25 |

FOREIGN PATENT DOCUMENTS

| | | |
|---|---|---|
| GB | 2 344 020 A | 5/2000 |
| JP | 8-31929 | 3/1996 |
| WO | WO 00/35216 | 6/2000 |
| WO | WO 00/49793 | 8/2000 |

* cited by examiner

Primary Examiner—Ahmad F. Matar
Assistant Examiner—Quynh H. Nguyen
(74) Attorney, Agent, or Firm—Morgan, Lewis & Bockius LLP

(57) ABSTRACT

A telephone communication method and system for retrieving and providing advertisement information that matches a communication terminal user's preference as to advertisement information. The telephone communication method of the invention is a method of providing the communication terminal with one or more pieces of advertisement information via a telephone network. This method obtains a plurality of pieces of advertisement information from an advertiser terminal prior to provision of the advertisement information on one hand, and obtains user-related information from the user's communication terminal as a retrieval condition for retrieval of the advertisement information on the other hand. The method then transmits to the communication terminal at least one piece of advertisement information retrieved from a plurality of pieces of advertisement information on the basis of the user-related information.

19 Claims, 13 Drawing Sheets

TELEPHONE COMMUNICATION SYSTEM AND METHOD, AND SERVER FOR PROVIDING ADVERTISEMENT INFORMATION

BACKGROUND OF THE INVENTION

1. Field of the Invention

The present invention relates to a telephone communication system and method for providing a communication terminal with one or more pieces of advertisement information via a telephone network, and also relates to a server for providing advertisement information.

2. Description of the Related Art

One of the existing services for providing advertisement information via a telephone provides advertisement information for a certain period, which starts immediately upon off-hooking of a telephone handset and ends when dialing a telephone number of a receiving party is complete. In this system, a telephone company discounts a telephone fee while it charges an advertisement company an advertisement fee. Japanese Patent Application, After-Examination Publication (Kokoku) No. 8-31929 teaches such technology.

This conventional system, however, distributes the same advertisement information to all the telephone users so that it does not always provide the telephone users with advertisements which they want to have. As a result, the telephone users do not listen to the advertisement information, and the advertisement activities are not useful the advertisement company. This is undesirable in terms of cost-effectiveness of the advertisement.

OBJECTS AND SUMMARY OF THE INVENTION

One object of the present invention is to provide a telephone communication system and a telephone communication method for retrieving advertisement information matching a communication terminal user's preference as to advertisement information and providing a user with such advertisement information, and to provide an advertisement information providing server used in such system and method.

According to one aspect of the present invention, there is provided a telephone communication system for providing a communication terminal, which is a subscriber of a communication company, with one or more pieces of advertisement information via a telephone network of a facility associated with the communication company, wherein the communication terminal includes means for transmitting user-related information and means for receiving a piece of advertisement information, and the communication company facility includes means for storing a plurality of pieces of advertisement information, means for retrieving a desired piece of advertisement information from the storing means, means for receiving the user-related information from the communication terminal, and means for transmitting the retrieved piece of advertisement information to the communication terminal.

According to another aspect of the present invention, there is provided a method of providing a communication terminal, which is a subscriber of a communication company, with one or more pieces of advertisement information via a telephone network of a facility associated with by the communication company when the communication terminal makes a request for connection to a second communication terminal, the method comprising the steps of receiving the connection request from the communication terminal, receiving user-related information from the communication terminal, retrieving a desired piece of advertisement information from advertisement information storage means, which stores a plurality of pieces of advertisement information, on the basis of the received user-related information, transmitting the retrieved piece of advertisement information to the communication terminal, and connecting the communication terminal with the second communication terminal such that these communication terminals can communicate with each other via the telephone network.

According to still another aspect of the present invention, there is provided an advertisement information providing server for use with a communication company adapted to connect a first communication terminal with a second communication terminal via a telephone network, the advertisement information providing server comprising means for storing a plurality of pieces of advertisement information, means for obtaining user-related information from the first and/or second communication terminal, means for retrieving at least one piece of advertisement information from the storing means, means for transmitting the retrieved piece of advertisement information to the first and/or second communication terminal, and means for connecting the first communication terminal with the second communication terminal via the telephone network.

DETAILED DESCRIPTION OF THE INVENTION

Embodiments of the present invention will now be described in reference to the accompanying drawings.

Figure 1:
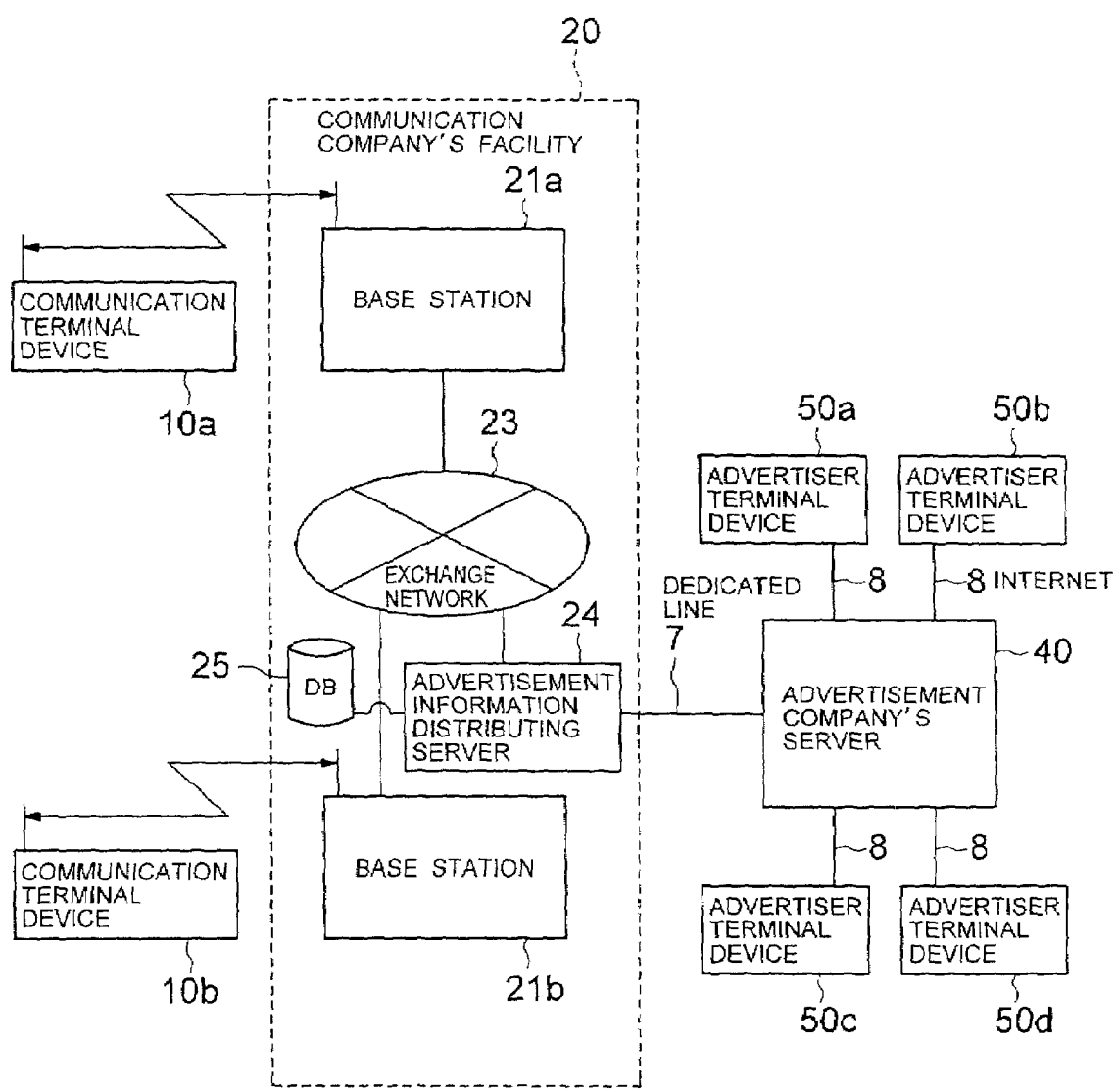
FIG. 1 illustrates an overall view of a network arrangement according to the present invention.

Referring to FIG. 1, illustrated is a network arrangement to describe an overview of the present invention. A communication company's facility 20 in this network includes a plurality of base stations 21a and 21b coupled to an exchange network 23, and a server for distributing advertisement information 24 coupled to the exchange network 23.

The base stations 21a and 21b are connected to communication terminals 10a and 10b by wire or wireless via transmitter/receiver means respectively. The exchange network 23 serves as means for connecting the communication terminals 10a and 10b with each other for telephone conversation. The advertisement information distribution server 24 connects to a database (DB) 25.

The communication company's facility 20 is connected to an advertisement company's server 40 via a dedicated line 7 such that it can communicate with the advertisement company's server 40. The advertisement company's server 40 is a conventional web server system, and connected to a plurality of advertiser's terminals 50a to 50d, each of which has a web browser function, via the Internet 8.

Figure 2:
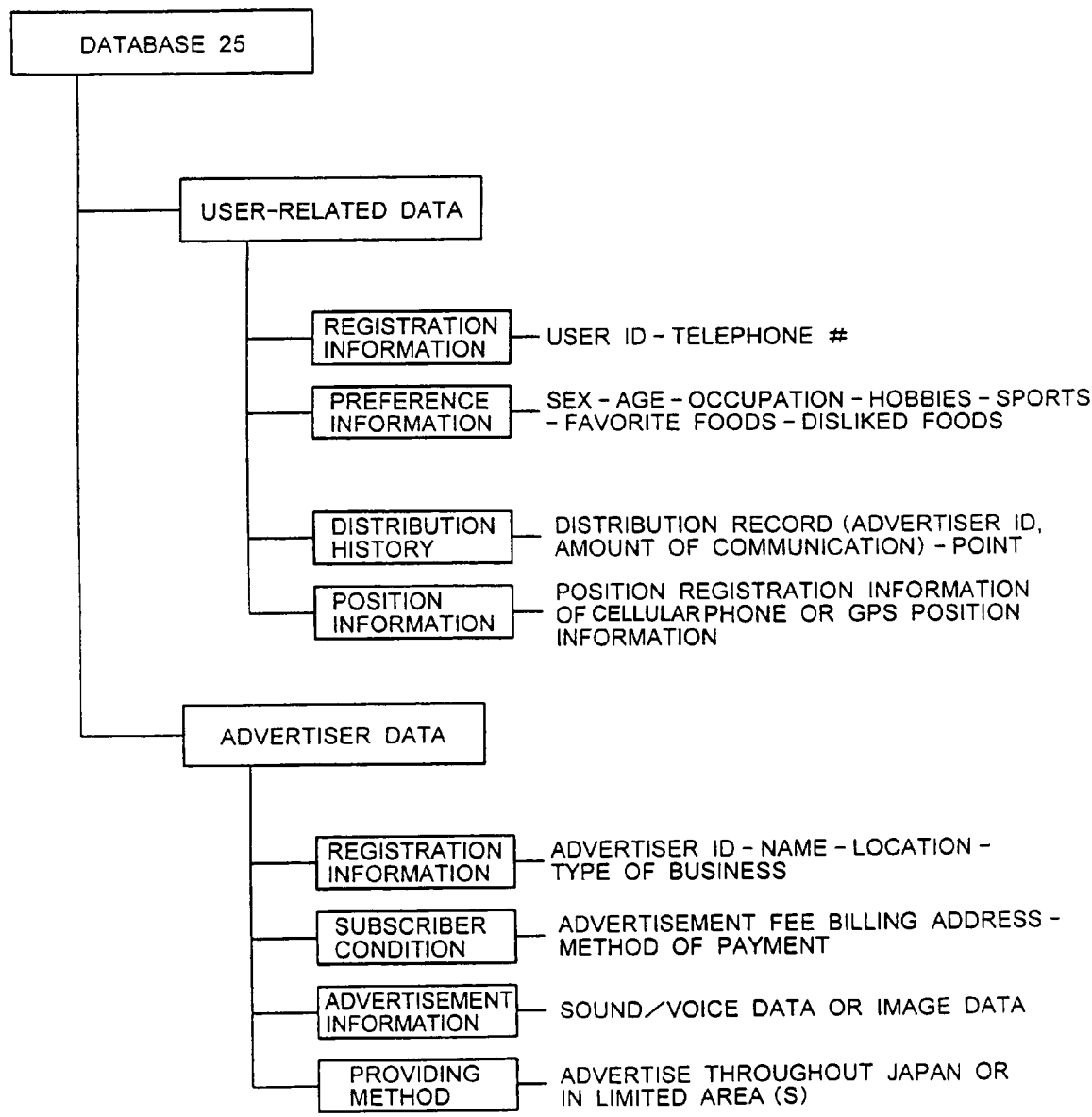
FIG. 2 illustrates an organizational structure of a database according to the present invention.

FIG. 2 illustrates a logical structure of the database 25 in this embodiment (first embodiment). The database 25 stores user-related information and advertiser data.

The user-related information includes, for example, registration information, preference information, distribution history and position information. The registration information contains user ID and telephone number. The preference information is information about the user's sex, age, occupation, hobbies, sports, favorite foods and disliked foods. The distribution history is information about records of distributed advertisements or achievements (information about which advertisement has been delivered to this user), and includes, for example, information about identification of the advertisement information advertiser and an amount of communication (in terms of, for instance, time and displayed volume). The distribution history may also include information about points given to the user on the basis of the advertisement received by the user. The position information may be position information used by a communication company that finds out a position of a communication terminal such as a cellular phone in order to decide a base station. Alternatively, the position information may derive from GPS or the like.

The advertiser data includes, for example, registration information, subscriber conditions, advertisement information and method of providing the advertisement information. The registration information includes information to identify an advertiser such as advertiser ID, name, location, kind of business, etc. The subscriber conditions include contract agreements on advertisement distribution activities such as an advertisement fee billing address, method of paying the advertisement fee, etc. The advertisement information includes advertisement information to be distributed to a user's telephone in a particular data format such as sound/voice data format and/or image data format. The user will receive the advertisement information in this particular data format. The providing method includes detailed information about a manner of providing the advertisement information. For instance, it includes information specifying the area(s) of distribution, i.e., whether the advertisement information should be distributed throughout Japan or in limited area(s).

Figure 3:
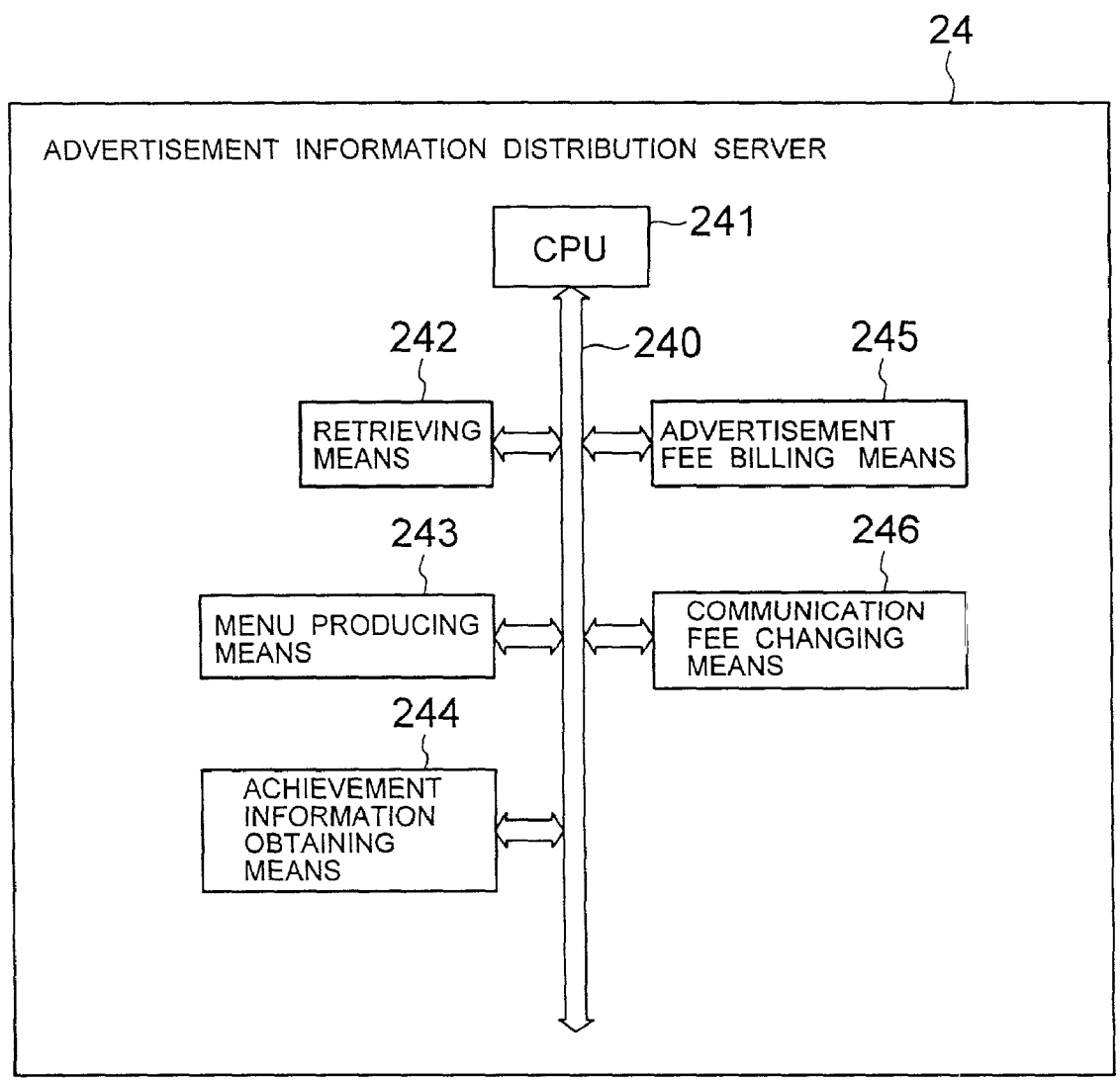
FIG. 3 illustrates a block diagram of an internal structure of an advertisement information distribution server according to the present invention.

Referring to FIG. 3, illustrated is an internal structure of the advertisement information distributing server 24. The advertisement information distributing server 24 has a CPU 241, to which retrieval means 242, menu producing means 243, achievement information obtaining means 244, advertisement fee billing means 245 and communication fee changing means 246 are connected via a common bus 240.

The retrieval means 242 retrieves advertisement information on the basis of the user-related information. The retrieval means 242 retrieves desired advertisement information from the database 25 in this embodiment. The menu producing means 243 produces a list or menu of advertisement information on the basis of the advertisement information. The achievement information obtaining means 244 controls (checks) achievements of advertisement distribution for the respective communication terminals. The advertisement fee billing means 245 bills an advertisement expense to the advertisement company. The communication fee changing means 246 changes the billing information, which is accumulated as the communication terminal utilizes the telephone network for communication, in accordance with a discount calculated on the basis of the achievement information.

Figure 4:
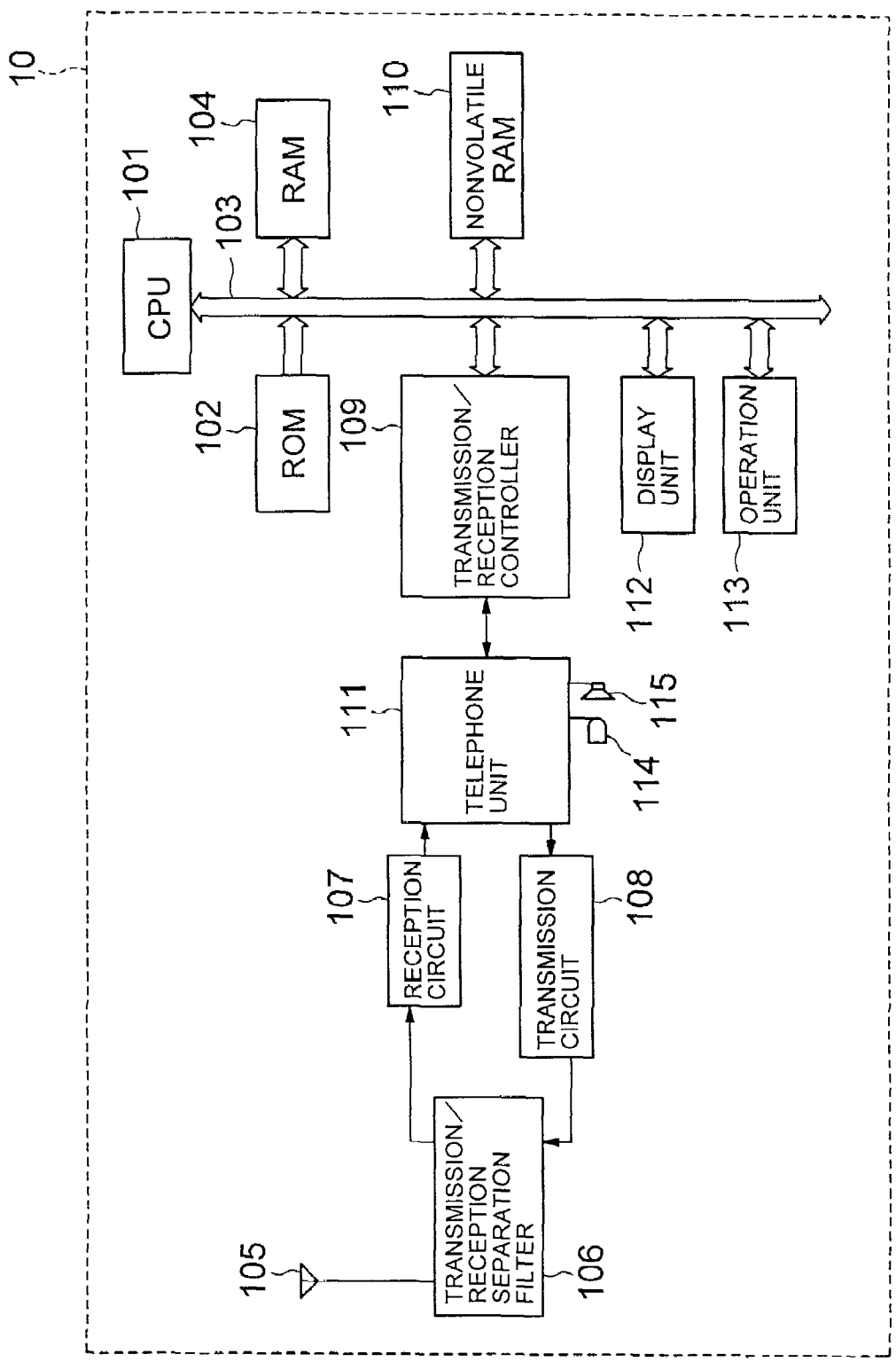
FIG. 4 illustrates a block diagram of an internal structure of a communication terminal according to the present invention.

Referring to FIG. 4, illustrated is the internal structure of the cellular phone, which is an example of the communication terminal 10 in the first embodiment. The communication terminal 10 has CPU 10, and CPU 10 is connected to ROM 102, RAM 104, nonvolatile RAM 110, transmission/reception controller 109, display unit 112 and operation unit 113 via a common bus 103. A telephone conversation unit 111 is connected to the transmission/reception controller 109. The telephone unit 111 is connected in parallel to a reception circuit 107 to process an incoming wireless signal received at an antenna 105, and a transmission circuit 108 to process an outgoing wireless signal transmitted from the antenna 105. The telephone unit 111 is also connected to a microphone 114 and speaker(s) 115 for general telephone conversation. The nonvolatile RAM 110 stores the user-related information of the user of the communication terminal 10 (will be described). The user-related information is input by the user who operates the display unit 12 and/or operation unit 113. Distributed advertisement information is reproduced from the speaker 115 or on the display unit 112.

Figure 5:
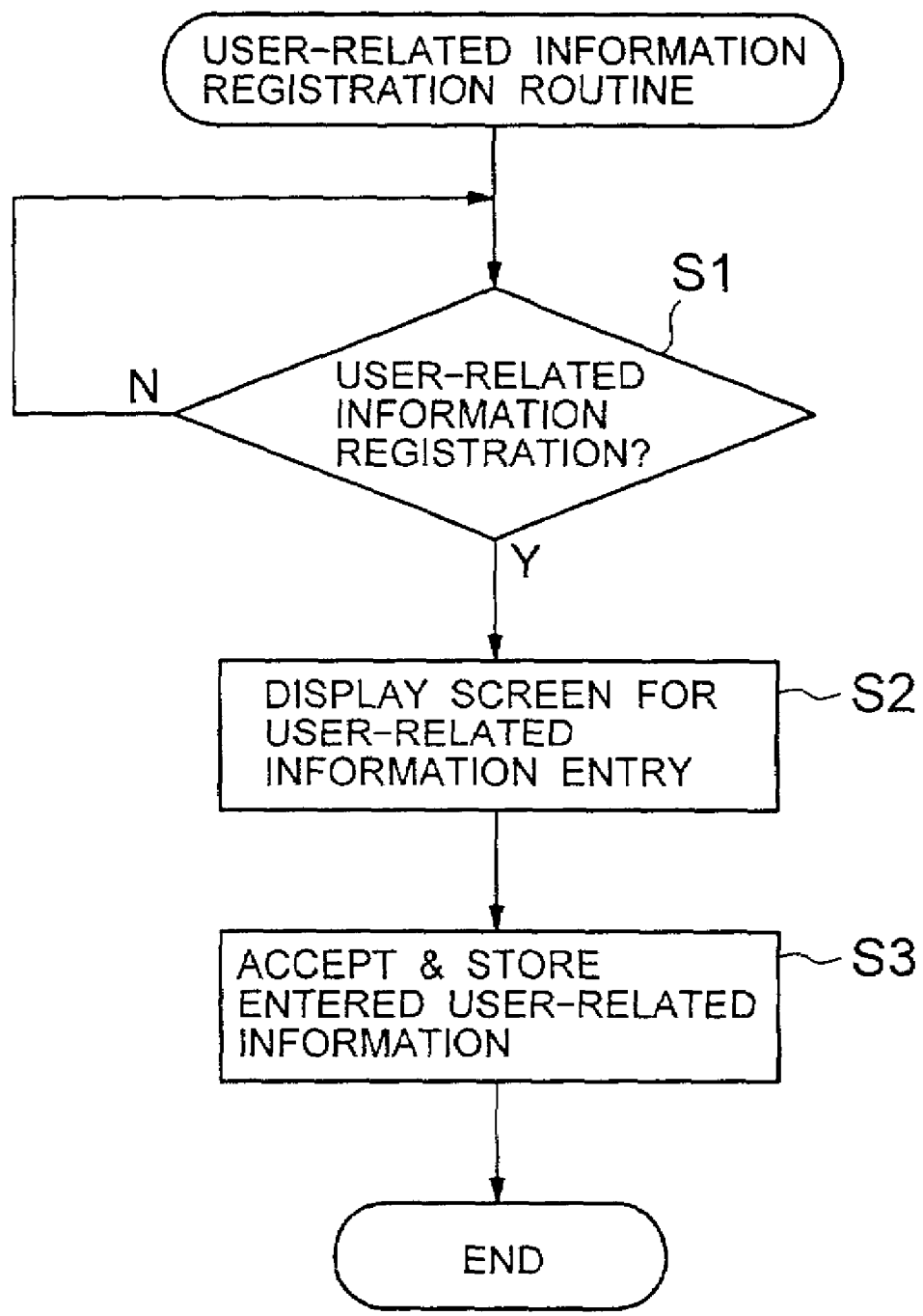
FIG. 5 is a flowchart showing a routine or procedure for registering user-related information performed by the communication terminal according to the present invention.

FIG. 5 illustrates a routine or procedure for registering the user-related information executed by the communication terminal in the first embodiment.

The user of the communication terminal 10 first operates the operation unit 113 of the communication terminal 10 to enter a request for user-related information registration. CPU 101 of the communication terminal 10 always monitors whether a request for user-related information registration is made by the user. If there is no request, the communication terminal 10 keeps monitoring (Step S1). If there is a request, the communication terminal 10 displays a screen for the user-related information registration in the display unit 112 (Step S2).

Subsequently, the user of the communication terminal 10 operates the operation unit 113 to enter user-related information in accordance with registration instructions indicated in the user-related information registration screen. The user-related information is, for example, information about user's favorite, including the user's sex, age, job, hobbies, sports, liked foods and disliked foods. A destination of the communication terminal user may also be registered as the user-related information in addition to the above mentioned information. The entered information is memorized in the nonvolatile RAM 110 of the communication terminal 10 (Step S3).

The foregoing procedure completes the registration of the user-related information into the communication terminal 10.

It should be noted that the registration procedure may be conducted beforehand or during establishment of telephone line connection.

It should also be noted that although the registered user-related information is stored in the communication terminal 10 in the above described registration procedure, it may be stored in the communication company facility 20. In this case, Step S1 in FIG. 5, for example, causes the communication terminal 10 to connect to the communication company facility 20 such that they can communicate with each other, and Step S3 causes the registered user-related information to be memorized in the database 25 of the communication company facility.

It should further be noted that while the registration procedure is performed by operating the operation unit 113 together with the display screen, it may be performed by voice recognition.

Figure 6:
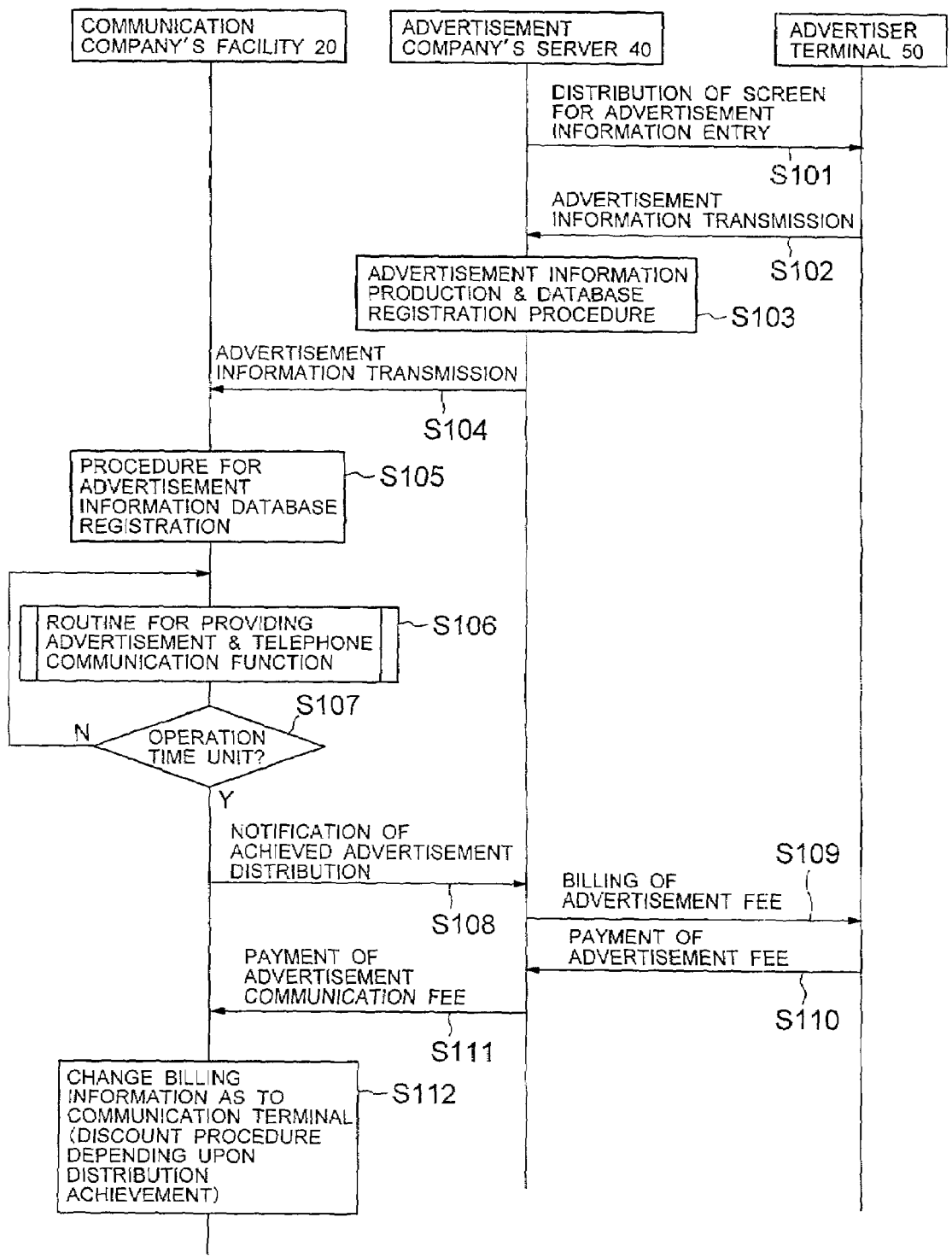
FIG. 6 is a sequence diagram showing an overall procedure according to the present invention.

FIG. 6 shows a sequence of overall procedure in the first embodiment.

The advertisement company server 40 first sends an advertisement information accepting screen to the advertiser terminal 50 so that the advertiser can register advertisement information (Step S101). An operator of the advertiser terminal 50 transmits advertisement information, which the advertiser wishes to provide the user with, by responding to this screen (Step S102). The advertisement information may be presented in the form of either sound/voice data or image data. The advertisement information is transmitted by, for example, specifying a file name of the data on the screen and instructing the transmission of the data to the advertisement company server 40 such that the advertisement company server 40 can upload the data (advertisement information). In addition to the transmission of the advertisement information, the manner of providing the advertisement information such as desired distribution areas may also be specified.

As the advertisement company server 40 receives the advertisement information, it edits into a format suited for actual distribution and registers it in the own database (not shown) (Step S103). The advertisement enterprise server 40 then sends the registered advertisement information to the communication company facility 20 via the dedicated line 7 (FIG. 1) (Step S104). Upon receiving the advertisement information, the communication company facility 20 registers it in the database 25 (Step S105).

The communication company facility 20 then executes a routine for advertisement provision and telephone conversation (Step S106). This routine will be described later in detail. By executing this routine, the procedure for providing the advertisement is performed together with the procedure for enabling the telephone conversation for which the communication terminal was originally designed. This routine is carried out every time a user of the communication terminal 10a or 10b makes a telephone call.

After Step S106, the communication company facility 20 determines whether an operation time unit is reached (Step S107). The operation time unit is a predetermined period to update the advertisement information and bill the advertisement fee incurred for the advertisement provision. If the operation time unit is not reached (Step S107, No), the routine for advertisement provision and telephone conversation is repeated.

If, on the other hand, the operation time unit is reached (Step S107, Yes), the communication company facility 20 transmits the achievement data of advertisement provision recorded in the routine of Step S107 to the advertisement company server 40 (Step S108). Upon receiving the advertisement distribution achievement data, the advertisement company server 40 transmits the advertisement fee billing information to the advertiser terminal 50 on the basis of the achieved advertisement distribution (Step S109). As the advertiser terminal 50 receives a bill for the advertisement, it pays the advertisement fee to the advertisement company server 40 (Step S110). This embodiment may be implemented with a fee settlement process using electronic money, i.e., electronic information that possesses a money-equivalent value. Upon receiving the payment, the advertisement company server 40 pays the advertisement communication fee to the communication company facility 20 (Step S111). This payment may also be settled using electronic money.

Finally, the information about the communication fee to be charged to the communication terminal 10a, which is accumulated as the communication terminal utilizes the public telephone line/network managed by (or associated with) the communication company for telephone communication, is changed in accordance with a certain discount rate calculated on the basis of the achievement information (Step S112). As a result, an operator of the communication terminal 10a can enjoy the discount applied to the public telephone network utilization fee in return to receiving the advertisement information.

Figure 7:
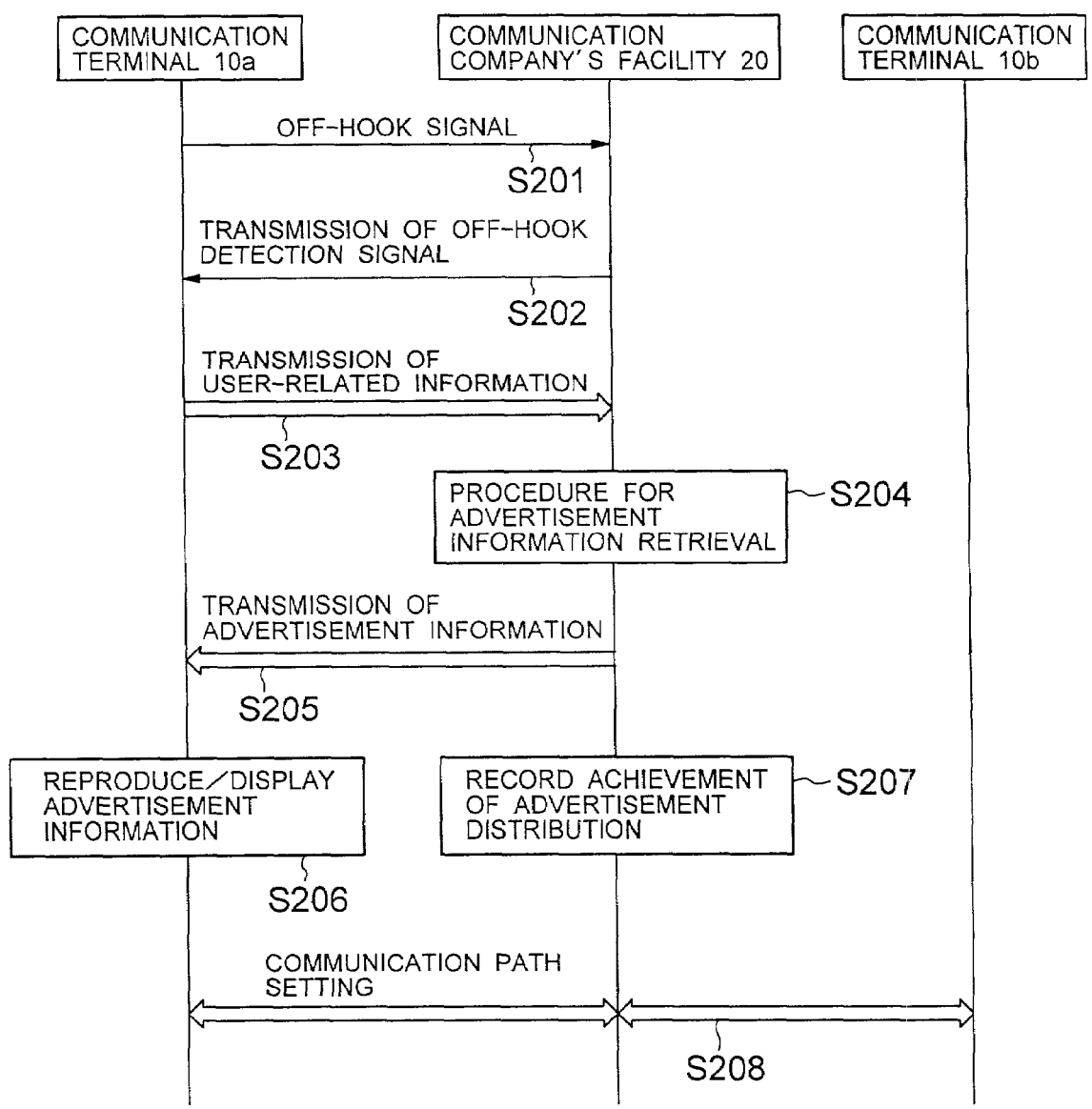
FIG. 7 is a sequence diagram showing a routine or procedure for providing advertisement and telephone conversation function (capability) according to a first embodiment of the present invention.

FIG. 7 illustrates a detailed sequence of a routine for providing the advertisement and telephone communication function in the first embodiment. In this embodiment, the communication terminal 10a receives the advertisement information via the communication company facility 20 in addition to a common telephone service. It should be assumed that the communication terminal 10a is a terminal for sending a telephone call and the communication terminal 10b is a terminal for receiving the telephone call.

The communication terminal 10a is first brought into an off-hook state when a handset is picked up. This off-hook state may not be detected on the basis of the off-hooking of the handset, but on the basis of a call request signal transmitted from the communication 10a as long as the call request signal is electrically equivalent to the off-hooking signal. The off-hook state is detected by the communication company facility 20 (Step S201). As the communication company facility 20 detects the off-hook state, it sends an off-hook detection signal to the communication terminal 10a (Step S202).

Upon receiving the off-hook detection signal, the communication terminal 10a transmits the user-related information stored in the built-in nonvolatile RAM 110 of the communication terminal device 10a to the communication company facility 20 (Step S203). A telephone number specifying the call receiving terminal is sent to the communication company facility 20 at the same time the user-related information is sent. It should be noted that the telephone number transmission may be performed in a later procedure when establishing the communication path (Step S208).

After receiving the user-related information, the communication company facility 20 retrieves the advertisement information on the basis of the received user-related information (Step S204). As described above, the user-related information includes information about the preference of the user who operates the communication terminal 10. The communication company facility 20 retrieves one or more pieces of advertisement information that match the user-related information from a plurality of pieces of advertisement information stored in the database 25. There may be a plurality of retrieving methods, and any one of them may be employed as long as at least one piece of advertisement information can be retrieved. Subsequently, the communication company facility 20 reads the retrieved advertisement information from the database 25 and transfers it to the communication terminal 10*a* (Step S205).

Upon receiving the advertisement information, the communication terminal 10*a* reproduces (or displays) it (Step S206). In the meantime, the communication company facility 20 records the achievement information about the advertisement information distribution in the database 25 (Step S207). The achievement information may include the identification of the advertiser of the distributed advertisement information and the amount of communication (e.g., time and displayed volume) as mentioned earlier.

After the reproduction of the advertisement information is finished, the communication company facility 20 performs the connection procedure such that the communication terminal 10*a* and communication terminal 10*b* can communicate with each other (Step S208).

In this manner, when the communication terminal 10*a* makes a request to the communication company facility 20 for telephone line connection to the communication terminal 10*b*, it also sends the information related to the user of the communication terminal 10*a* and receives the advertisement information on the basis of the user-related information in the first embodiment of the present invention.

Although the user-related information is sent after the communication terminal 10*a* makes the request for telephone line connection in the above described embodiment, the user-related information may be registered beforehand in the communication company facility 20 as described in connection with FIG. 5. In such a case, Step S203 adapted to transmit the user-related information in the illustrated embodiment will be dispensed with.

Figure 8:
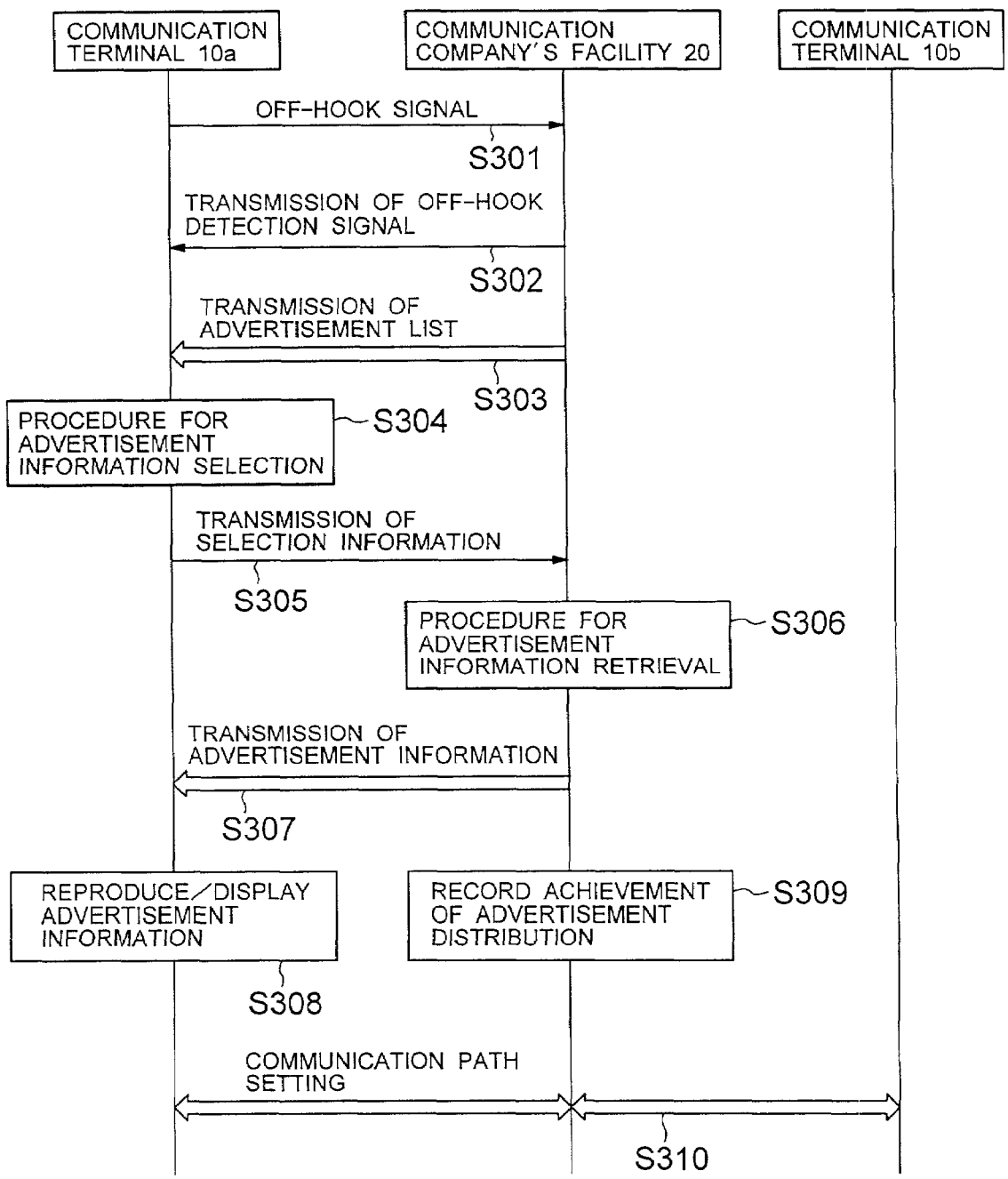
FIG. 8 is a detailed sequence diagram showing a routine or procedure for providing advertisement and telephone conversation function according to a second embodiment of the present invention.

Referring to FIG. 8, illustrated is another routine for providing the advertisement and telephone communication function according to a second embodiment of the present invention. Unlike the first embodiment in which the advertisement information is retrieved in accordance with the user-related information of the telephone user, the communication company facility 20 provides the communication terminal 10*a* with a menu (list) of the advertisement information, and delivers the advertisement information on the basis of the selection made by the user on the menu in the second embodiment.

The communication terminal 10*a* is first brought into the off-hook state when the handset is picked up. This off-hook state is detected by the communication company facility 20 (Step S301). As the communication company facility 20 detects the off-hook state, it sends the off-hook detection signal to the communication terminal 10*a* (Step S302). Upon receiving the off-hook detection signal, the communication terminal 10*a* transmits the telephone number specifying the call receiving terminal to the communication company facility 20. It should be noted that the telephone number transmission may be performed in a later procedure when establishing the communication path (Step S310).

After that, the communication company facility 20 transmits the menu, i.e., a list (summary) of advertisements to the communication terminal 10*a*. (Step S303). Upon receiving the list of advertisement information, the communication terminal 10*a* displays the list of advertisements in the display unit 112 of the communication terminal 10*a* to urge the user to select a desired piece of advertisement information from the list of advertisements. Alternatively, the communication terminal 10 may issue voice instructions (guidance) to urge the user's selection. The user operates the operation unit 113 to enter a selection command when the advertisement list is displayed or the voice instructions are issued (Step S304). The communication terminal 10*a* then sends the selection result as selection information to the communication company facility 20 (Step S305).

Upon receiving the selection information, the communication company facility 20 retrieves corresponding advertisement information from the database 25 on the basis of the selection information (Step S306).

The communication company facility 20 then transmits the retrieved advertisement information to the communication terminal 10*a* (Step S307). Upon receiving the advertisement information, the communication terminal 10*a* reproduces it by voice data or displayed data (Step S308). As the reproduction is complete, the communication company facility 20 records the achievement information about the advertisement information distribution (Step S309).

After the reproduction of the advertisement information is complete, the communication company facility 20 performs the connection procedure such that the communication terminals 10*a* and 10*b* can communicate with each other (Step S310).

In the second embodiment, therefore, when the communication terminal 10*a* makes a request to the communication company facility 20 for telephone line connection to the communication terminal 10*b*, the communication company facility 20 sends the list or menu of advertisement information to the communication terminal 10*a* and the communication terminal 10*a* selects the desired advertisement information from the list of advertisement information. Accordingly, the user of the communication terminal 10*a* can have advertisement information which the user likes.

Figure 9:
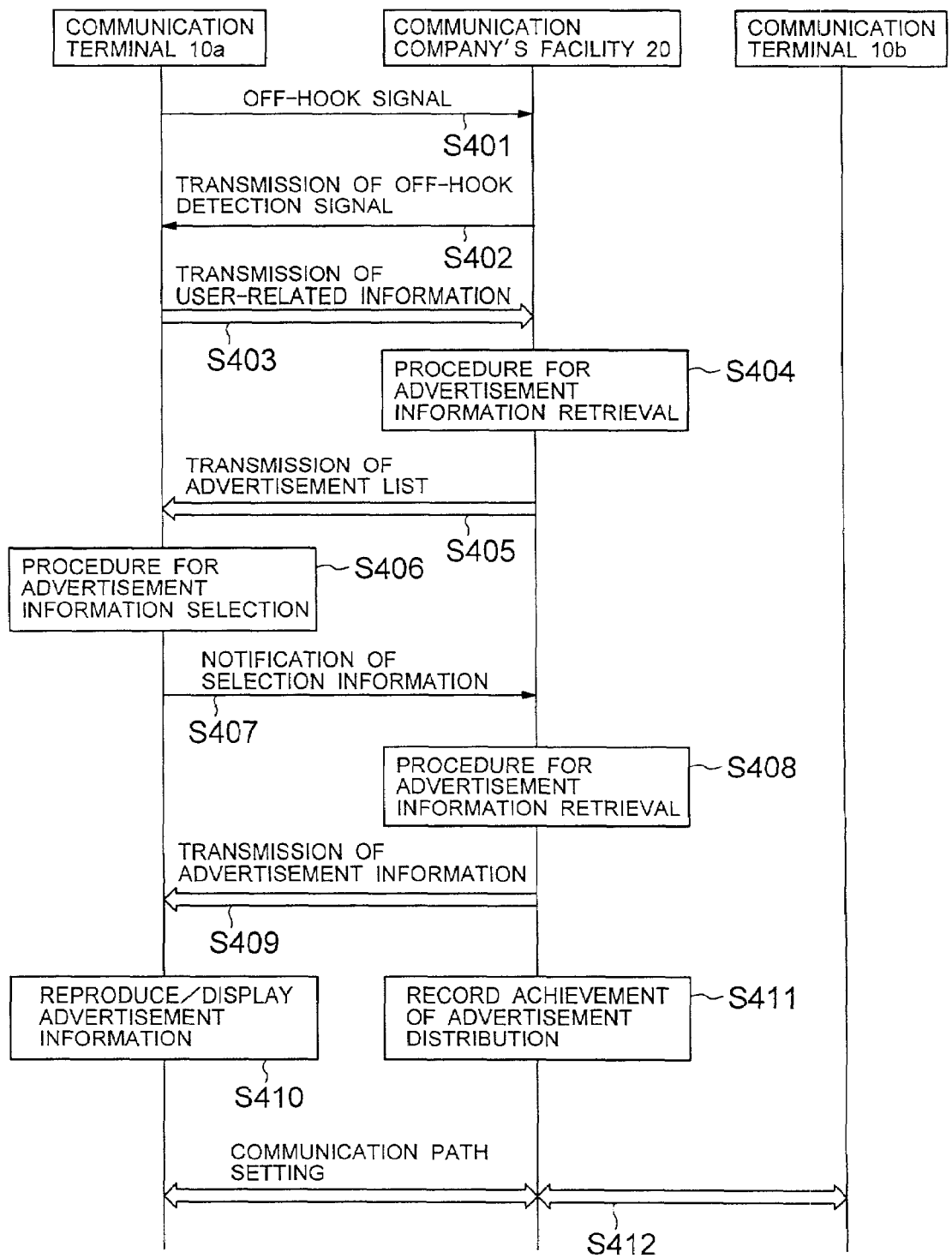
FIG. 9 is a detailed sequence diagram showing a routine or procedure for providing advertisement and telephone conversation function according to a third embodiment of the present invention.

FIG. 9 illustrates a routine for providing the advertisement and telephone communication function according to the third embodiment. In this embodiment, an amount of advertisement information included in the advertisement information list is reduced as compared with the second embodiment by taking advantage of the user-related information.

The communication terminal 10*a* is first brought into the off-hook state when a handset is picked up. This off-hook state is detected by the communication company facility 20 (Step S401). As the communication company facility 20 detects the off-hook state, it sends the off-hook detection signal to the communication terminal 10*a* (Step S402). Subsequently, the communication terminal 10*a* transmits the user-related information to the communication company facility 20 (Step S403). The telephone number specifying the call receiving terminal is sent to the communication company facility 20 together with the user-related information. It should be noted that the telephone number transmission may be performed in a later procedure when establishing the communication path (Step S412).

The communication company facility 20 retrieves a plurality of candidates from the advertisement information stored in the database 25 on the basis of the received user-related information (Step S404). The communication company facility 20 then creates a list of the retrieved advertisement candidates and sends it to the communication terminal 10a (Step S405).

Upon receiving the advertisement list, the communication terminal 10a displays it in the display 112. It should be noted that voice instructions may be used to urge the user to select the advertisement information. The user operates the operation unit 113 of the communication terminal 10a or utters a voice response to choose desired one item (one candidate) from the advertisement information list (Step S406). The communication terminal 10a then notifies the communication company facility 20 of the information about the chosen item (i.e., selection information) (Step S407).

Upon receiving the selection information, the communication company facility 20 retrieves advertisement information from the database 25 again in accordance with the selection information (Step S408). The communication company facility 20 sends the retrieved advertisement information to the communication terminal 10a (Step S409). The communication terminal 10a reproduces or displays the advertisement information (Step S410). In the meantime, the communication company facility 20 records the achievement information about the advertisement information distribution in the database 25 (Step S411).

After the reproduction of the advertisement information is complete, the communication company facility 20 performs the connection procedure such that the communication terminals 10a and 10b can communicate with each other (Step S412).

In this manner, since the communication company facility 20 creates the advertisement information list or menu on the basis of the user-related information of the communication terminal 10a, the user can select advertisement information from the menu that matches the user's preference in the third embodiment. Thus, the user is given advertisement information which matches the user's preference.

Figure 10:
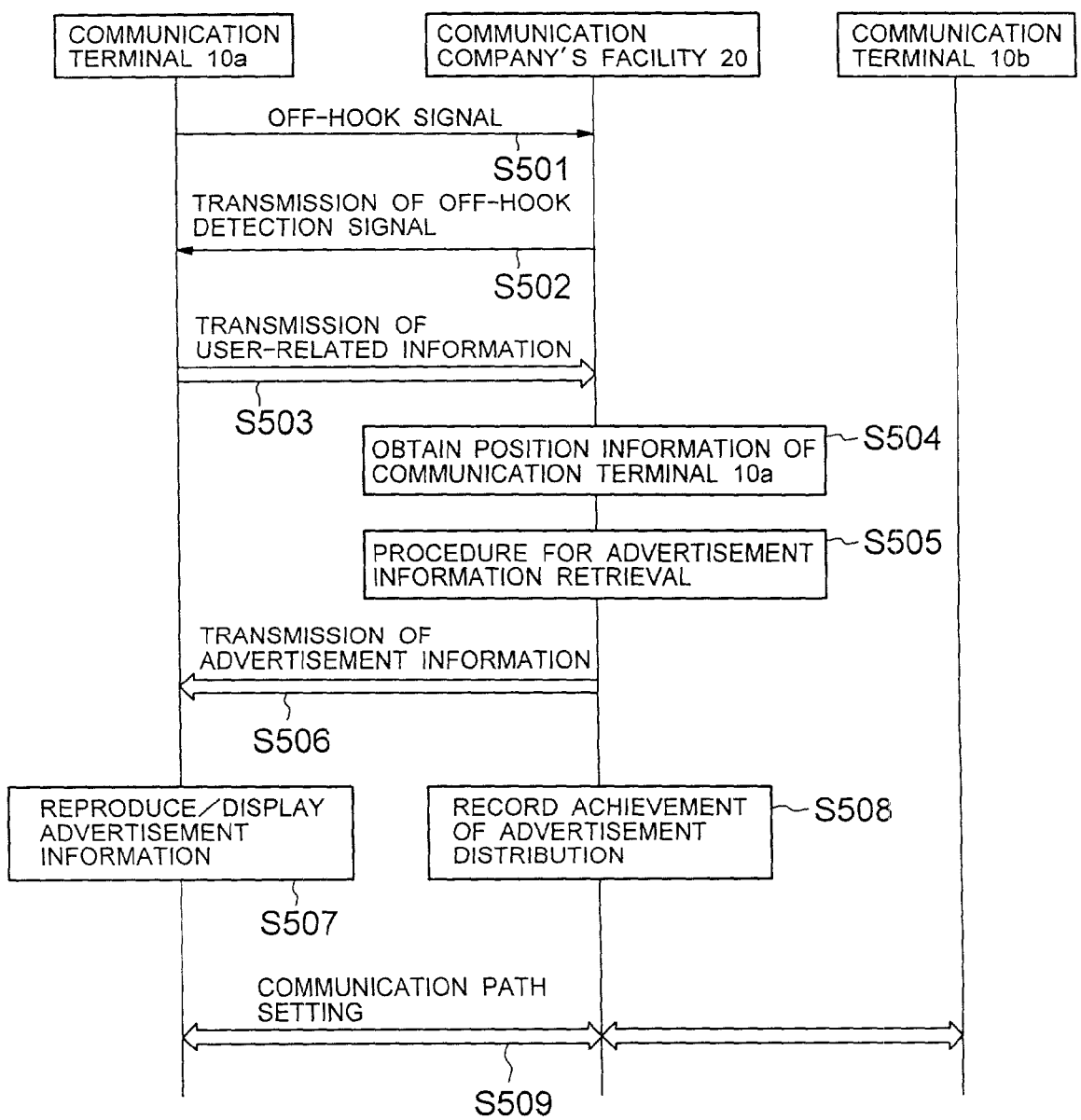
FIG. 10 is a detailed sequence diagram showing a routine or procedure for providing advertisement and telephone conversation function according to a fourth embodiment of the present invention.

FIG. 10 illustrates a routine for providing the advertisement and telephone communication function in the fourth embodiment. This embodiment is similar to the first embodiment shown in FIG. 7, but information representing a geographical position of the communication terminal 10a when it is used is additionally considered as another condition for advertisement information retrieval.

The communication terminal 10a is first brought into the off-hook state when the handset is lifted up. This off-hook state is detected by the communication company facility 20 (Step S501). As the communication company facility 20 detects the off-hook state, it sends the off-hook detection signal to the communication terminal 10a (Step S502). Upon receiving the off-hook detection signal, the communication terminal 10a transmits the user-related information to the communication company facility 20 (Step S503). The telephone number specifying the call receiving terminal is sent to the communication company facility 20 together with the user-related information. It should be noted that the telephone number transmission may be performed in a later procedure when establishing the communication path (Step S509).

After receiving the user-related information, the communication company facility 20 obtains the information about the geographical position of the communication terminal 10a (Step S504). This position information may be position information which the base station adapted to support the communication terminal 10a generally holds. Alternatively, a position information obtaining function or device such as GPS may be associated with the communication terminal 10a such that the position information provided from GPS is transmitted to the communication company facility 20. This position information is also included in the user-related information.

Upon receiving the user-related information, the communication company facility 20 retrieves the advertisement information on the basis of the received user-related information (Step S505). As described above, the user-related information includes information about the preference of the user who operates the communication terminal 10a and the geographical position of the communication terminal 10a. The communication company facility 20 retrieves one or more pieces of advertisement information that match the user-related information from the advertisement information stored in the database 25. Preferably the advertisement information in a certain area that includes the location of the communication terminal 10a is retrieved on the basis of the geographical position information. The communication company facility 20 may calculate or predict the change of the geographical position of the communication terminal 10a and retrieve advertisement information in the moving direction of the communication terminal 10a. There may be a plurality of retrieving methods, and any one of them may be employed as long as at least one piece of advertisement information can be retrieved.

Subsequently, the communication company facility 20 reads the advertisement information from the database 25 and transfers it to the communication terminal 10a (Step S506). Upon receiving the advertisement information, the communication terminal 10a reproduces or displays it (Step S507). In the meantime, the communication company facility 20 records the achievement information about the advertisement information distribution in the database 25 (Step S508).

After the advertisement information reproduction is complete, the communication company facility 20 performs the connection procedure such that the communication terminals 10a and 10b can communicate with each other (Step S509).

In this manner, since the communication company facility 20 retrieves the advertisement information on the basis of the user-related information including the geographical position information of the communication terminal 10a, it is possible for the communication terminal 10a to have the advertisement information that matches the preference and the current location in the fourth embodiment. It should be noted that although the geographical position information and the user's preference information are both included in the user-related information in this embodiment, the geographical position information may only be utilized. In such a case, the retrieval procedure may be carried out on the basis of only the geographical position information of the communication terminal 10a.

Figure 11:
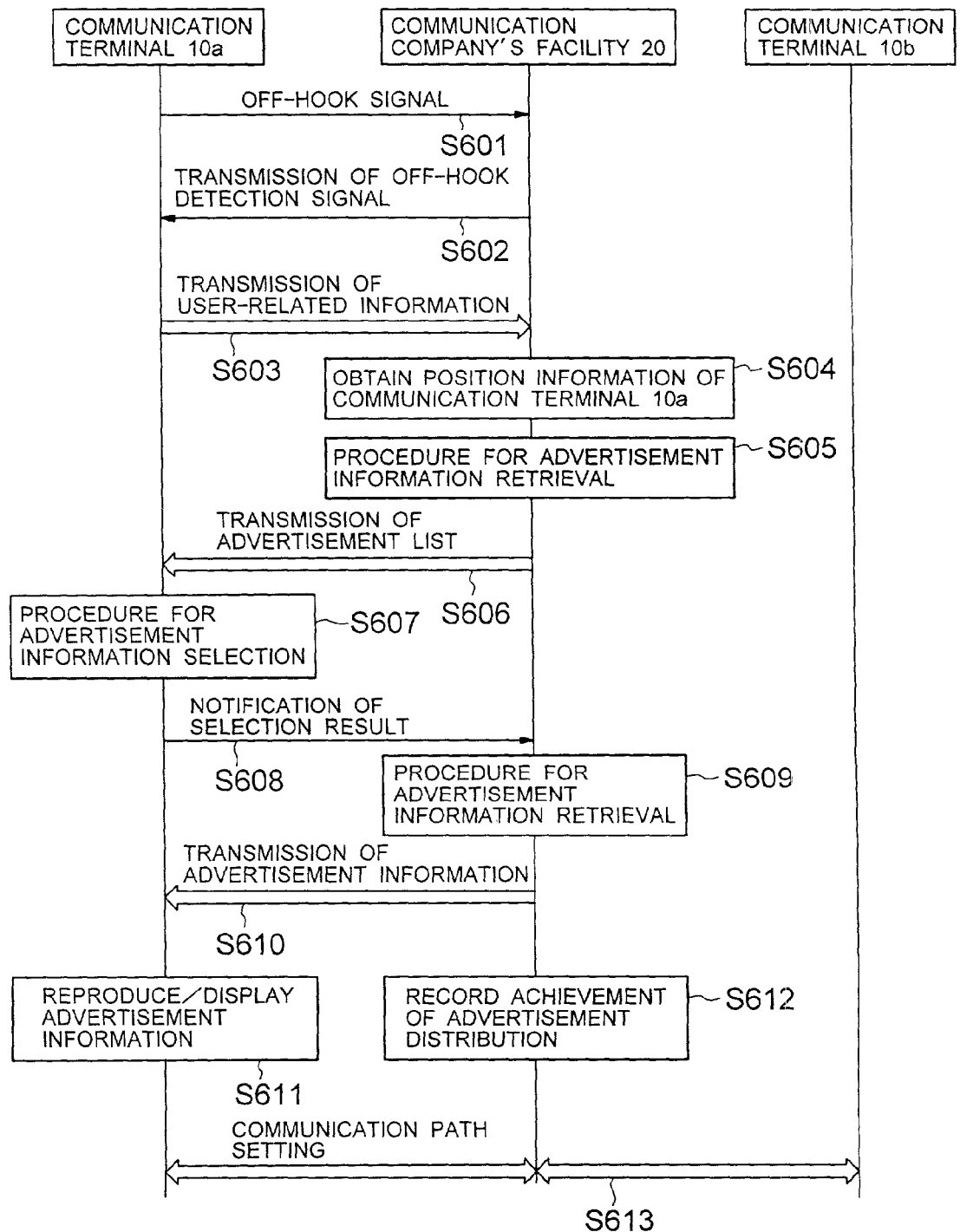
FIG. 11 is a detailed sequence diagram showing a routine or procedure for providing advertisement and telephone conversation function according to a fifth embodiment of the present invention.

FIG. 11 illustrates a routine for providing the advertisement and telephone communication function according to the fifth embodiment. This embodiment is similar to the third embodiment shown in FIG. 9, but the geographical position information of the communication terminal 10a when it is used is also taken into account as the retrieval condition when preparing the list of advertisement information.

The communication terminal 10a is first brought into the off-hook state when the handset is picked up. This off-hook state is detected by the communication company facility 20

(Step S601). As the communication company facility 20 detects the off-hook state, it sends the off-hook detection signal to the communication terminal 10a (Step S602). Subsequently, the communication terminal 10a transmits the user-related information to the communication company facility 20 (Step S603). The telephone number specifying the call receiving terminal is sent to the communication company facility 20 together with the user-related information. It should be noted that the telephone number transmission may be performed in a later procedure when establishing the communication path (Step S613).

The communication company facility 20 then obtains the geographical position information of the communication terminal 10a (Step S604). The geographical position information is acquired with the same method as the above described fourth embodiment. The communication company facility 20 retrieves a plurality of advertisement information candidates from the database 25 on the basis of the user-related information sent from the communication terminal 10a and the above mentioned position information (Step S605). The communication company facility 20 then creates a list of advertisement information using the retrieved candidates, and transfers it to the communication terminal 10a (Step S606).

The communication terminal 10a displays the advertisement list in the display unit 112. Alternatively, the communication terminal 10a may use voice instructions to urge the user to select one piece of advertisement information from the advertisement list. The user operates the operation unit 113 of the communication terminal 10a or utters a voice in response to the voice instructions to select desired advertisement information from the advertisement information candidates (Step S607). The communication terminal 10a notifies the communication company facility 20 of the selection result (Step S608).

Upon receiving the selection result, the communication company facility 20 retrieves the advertisement information from the database 25 again in accordance with the selection result (Step S609). The communication company facility 20 then transmits the retrieved advertisement information to the communication terminal 10a (Step S610). The communication terminal 10a reproduces or displays this advertisement information (Step S611). In the meantime, the communication company facility 20 records the achievement about the advertisement information distribution in the database 25 (Step S612).

After the reproduction of the advertisement information is complete, the communication company facility 20 performs the connection procedure such that the communication terminals 10a and 10b can communicate with each other (Step S613).

In this manner, since the communication company facility 20 creates the advertisement information list or menu on the basis of the user-related information that includes the geographical position information of the communication terminal 10a, the user can select advertisement information from the menu that matches the user's preference and current location in the fifth embodiment. Thus, the user is given advertisement information which matches the user's preference. It should be noted that although the geographical position information and the user's preference information are both included in the user-related information in this embodiment, the geographical position information may only be utilized. In such a case, the advertisement menu may be prepared on the basis of only the geographical position information of the communication terminal 10a.

Figure 12:
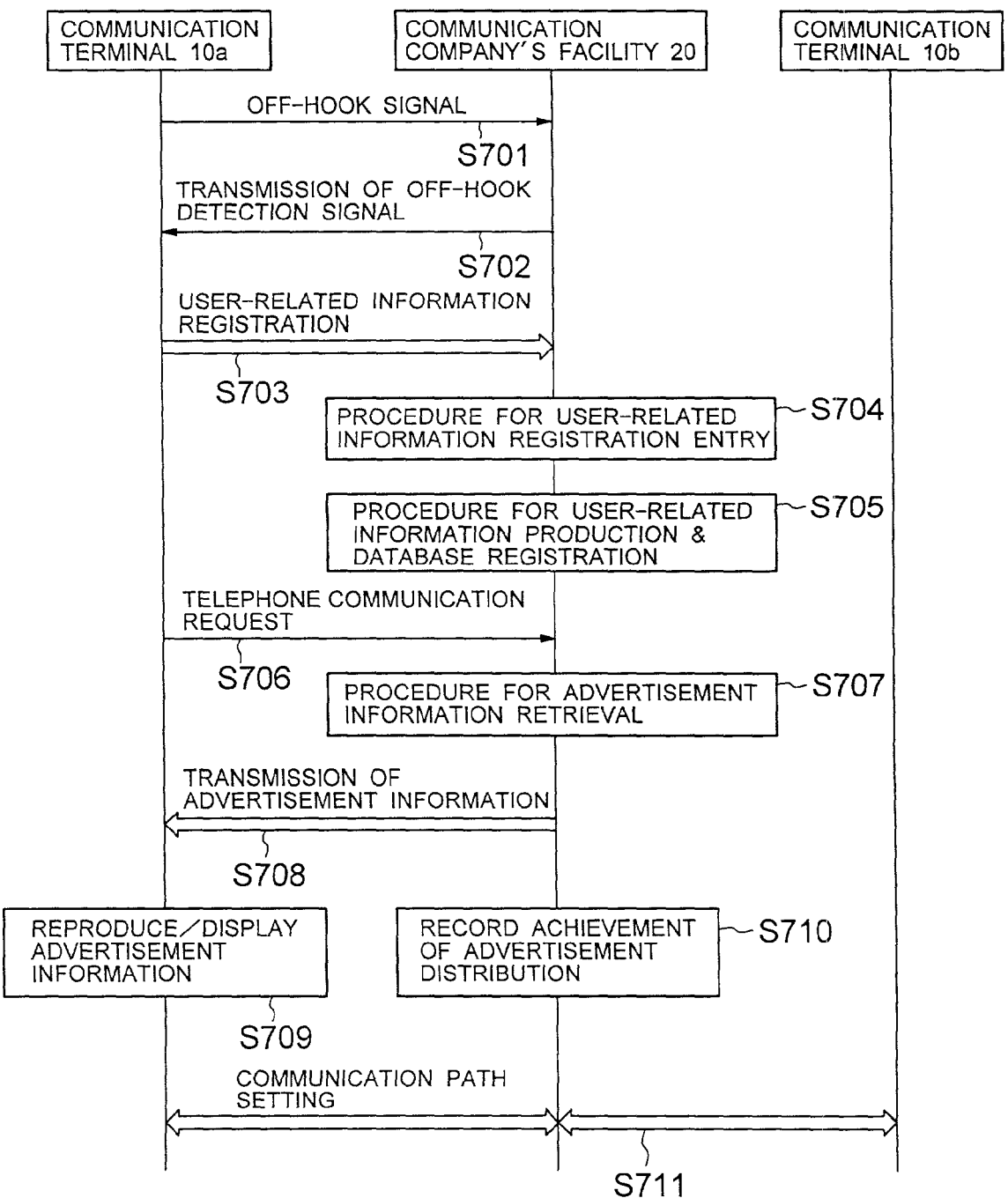
FIG. 12 is a detailed sequence diagram showing a routine or procedure for providing advertisement and telephone conversation function according to a sixth embodiment of the present invention.

Referring to FIG. 12, illustrated is a routine for providing the advertisement and telephone communication function according to the sixth embodiment of the present invention. Unlike the first embodiment shown in FIG. 7, the user-related information is registered every time the telephone line connection is requested in this embodiment.

The communication terminal 10a is first brought into the off-hook state when the handset is picked up. This off-hook state is detected by the communication company facility 20 (Step S701). The communication company facility 20 then sends the off-hook detection signal to the communication terminal 10a (Step S702).

Upon receiving the off-hook detection signal, the communication terminal 10a registers the user-related information in the communication company facility 20 (Step S703). This registration is conducted by the operator of the communication terminal 10a using the display unit 112 and/or the operation unit 113 of the communication terminal 10a. When the communication company facility 20 receives the user-related information together with the registration request, it accepts the user-related information (Step S704) and registers it in the database 25 (Step S705).

After that, the communication terminal 10a sends a request for telephone communication together with the telephone number specifying the call receiving terminal (Step S706). In response to this request, the communication company facility 20 retrieves advertisement information from the database 25 (Step S707), and transmits the retrieved advertisement information to the communication terminal 10a (Step S708). Upon receiving the advertisement information, the communication terminal 10a reproduces or displays it (Step S709). In the meantime, the communication company facility 20 records the achievement of the advertisement information distribution in the database 25 (Step S710).

After the reproduction of the advertisement information is finished, the communication company facility 20 performs the connection procedure such that the communication terminal 10a can communicate with the communication terminal 10b (Step S711).

In this manner, since the user-related information can be registered every time a telephone call is made in the sixth embodiment, it is possible to register the advertisement information that best reflects the situation of the time when the telephone call is made. Accordingly, the user is provided with the advertisement information that matches the user's preference. It should be noted that the method of registering the user-related information in this embodiment may be applied to the third, fourth and fifth embodiments.

Figure 13:
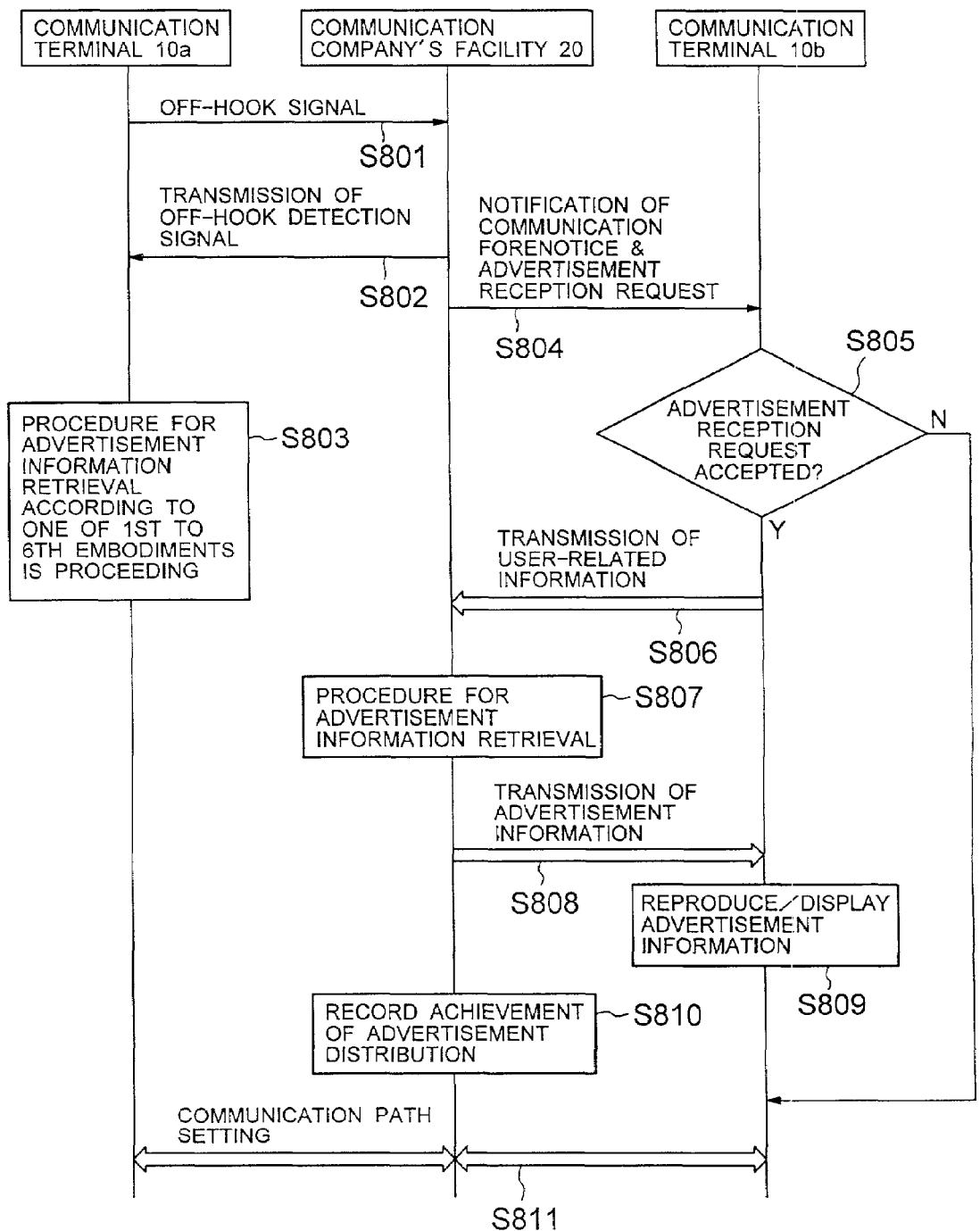
FIG. 13 is a detailed sequence diagram showing a routine or procedure for providing advertisement and telephone conversation function according to a seventh embodiment of the present invention.

Referring to FIG. 13, illustrated is a routine for providing the advertisement and telephone communication function according to the seventh embodiment of the present invention. This embodiment deals with a case where the advertisement information is distributed to not only the call making terminal but also the call receiving terminal.

At first, the communication terminal 10a becomes the off-hook state when the handset is off hooked. This off-hook state is detected by the communication company facility 20 (Step S801). The communication company facility 20 then sends the off-hook detection signal to the communication terminal 10a (Step S802).

Upon receiving the off-hook detection signal, the communication terminal 10a performs the advertisement information retrieval procedure according to one of the first to sixth embodiments (Step S803).

The communication company facility 20 sends an announcement or forenotice about the telephone communication and a request for the advertisement information reception to the communication terminal 10b on the basis of the telephone number of the call receiving terminal detected during Step S803 (Step S804). Upon receiving the telephone communication forenotice and advertisement information reception request, the communication terminal 10b inquiries the user whether the advertisement information should be received or not, by indications (question messages) made on the display unit 112 of the communication terminal 10b or the voice produced from the speaker 115 (Step S805).

In response to the inquiry, the user enters an answer into the operation unit 112 or utters an answer so as to indicate the acceptance or refusal. If the user does not want to receive the advertisement information, the communication terminal 10b is brought into a stand-by condition until Step S811, which is the step for the communication line establishment (will be described). Alternatively, the line connection between the communication terminal 10b and the communication company facility 20 may be terminated until the line connection between the communication terminals 10a and 10b is established.

If, on the other hand, the user accepts the advertisement information distribution, the communication terminal 10b sends user-related information to the communication company facility 20 (Step S806). The user-related information is entered by the user of the communication terminal 10b who operates the operation unit 113 of the communication terminal 10b, as in case of the communication terminal 10a.

It should be noted that acceptance or refusal of the advertisement information distribution may be memorized in the communication terminal 10b by the user beforehand, and the communication terminal 10b may automatically determine whether the advertisement information distribution should be accepted or not upon receiving the inquiry about the advertisement information distribution and transmit the answer (acceptance or refusal) to the communication company facility 20.

When the communication company facility 20 receives the user-related information, it refers to the advertisement information stored in the database 25 on the basis of the user-related information to retrieve advertisement information that matches the user-related information (Step S807). The communication company facility 20 then transmits the retrieved advertisement information to the communication terminal 10b (Step S808). Upon receiving the advertisement information, the communication terminal 10b reproduces or displays it (Step S809).

In the meantime, the communication company facility 20 records the achievement of the advertisement information distribution to the communication terminal 10b (Step S810). Since the communication terminal 10b is not charged for the communication fee in this instance, the achievement of the advertisement information is converted into points and memorized in the database. When the communication terminal 10b becomes a calling terminal, a communication fee will be discounted in accordance with the accumulated points.

After the communication terminals 10a and 10b reproduce the advertisement information, the communication company facility 20 performs the connection procedure such that the communication terminal 10a can communicate with the communication terminal 10b (Step S811).

In this manner, the advertisement information can be delivered to not only the calling terminal but also the receiving terminal in the seventh embodiment. The method of distributing the advertisement information to the receiving terminal (i.e., communication terminal 10b) may be one of those described in the second to sixth embodiments. It is also satisfactory that the advertisement information may not be received by the calling terminal (i.e., communication terminal 10a) but the receiving terminal (i.e., communication terminal 10b) only. In this case, the communication fee discount resulting from the achievement of the advertisement information distribution to the communication terminal 10b will be applied to the communication fee charged to the communication terminal 10a.

The communication terminals in the first to seventh embodiments may memorize the advertisement information such that they can replay or reproduce the advertisement information at any time. The user of each communication terminal may therefore be able to listen to and/or see the advertisement information anytime the user wants to do so. The voice and/or image reproduction of the advertisement information is not limited to before and after the telephone number transmission. For example, it may be carried out while the telephone line connection is being maintained (e.g., while the telephone conversation is taking place). The advertisement information may be distributed at predetermined intervals. The telephone user may be able to interrupt the advertisement information distribution. In such a case, the telephone fee discount may not be given to the telephone user, or only a small (smaller) amount of discount may be given. The telephone fee discount may vary with the time. Another advertisement information of another advertiser may be inserted, reproduced and displayed. This "another advertisement" may be the second candidate among a plurality of pieces of advertisement information retrieved from the database.

The method of providing the advertisement information according to the present invention is applicable to not only a fixed telephone set or terminal, but also a mobile telephone set. In this case, the distribution of the advertisement information on the basis of the geographical position of the communication terminal as in the second embodiment may be effective. If the present invention is applied to the mobile telephone, destination information may be included in the user-related information such that advertisement information useful on the way to and/or at the destination will be distributed to the telephone user when a telephone call is made on the way to the destination.

The communication company facility 20 may memorize which advertisement information has been distributed to which communication terminal user in the form of distribution history or record in the database 25 and the distribution history may be added to the retrieval conditions such that the same advertisement information will not be distributed to the same communication terminal repeatedly within a predetermined period. The distribution history may also be taken into account as the retrieval condition when the list of advertisement information is prepared.

Although the calling terminal is set up to receive the advertisement information distributed in accordance with teaching of the present invention in the above described embodiments, each user of the communication terminal may be able to decide whether the advertisement information should be received or refused. For example, if the user of the calling terminal wishes to receive the advertisement information, the user may enter a predetermined series of numbers (i.e., identification number) before or after the user enters the telephone number of the receiving terminal subsequent to reception of the off-hook detection signal. The communication company facility 20 may then start the routine for providing the advertisement information and telephone communication function according to the present invention in response to the identification number.

While the routine for providing the advertisement information and telephone communication function is executed for the communication terminal that subscribes with the communication company facility on information distribution in the above described embodiments, it may also be executed for someone else's telephone or pay phone. In this case, a user may enter a predetermined series of numbers (i.e., identification number) identifying the user itself before or after the entering a telephone number of a receiving terminal subsequent to reception of an off-hook detection signal. The communication company facility 20 may then start the routine for providing the advertisement information and telephone communication function according to the present invention in response to the identification number. If the user-related information is registered in the communication company facility 20, the communication company facility may identify the user and retrieve the advertisement information on the basis of the identification information.

The advertisement information distributing method of the present invention can provide a communication terminal user with advertisement information that matches the communication terminal user's preference. This helps an advertising company perform advertisement activities efficiently.

This application is based on a Japanese Patent Application No. 2000-311637 which is incorporated herein by reference.

What is claimed is:

1. A telephone communication system for providing a communication terminal, which is a subscriber of a communication company, with a piece of advertisement information via a telephone network of a facility associated with the communication company,
    wherein the communication terminal includes means for transmitting user-related information and means for receiving the piece of advertisement information,
    wherein the facility includes means for storing pieces of advertisement information, means for retrieving a particular piece of advertisement information from the storing means, means for receiving the user-related information from the communication terminal, and means for transmitting the retrieved piece of advertisement information to the communication terminal,
    wherein the retrieving means of the facility performs a retrieval procedure on the basis of the user-related information sent from the communication terminal,
    wherein when the communication terminal sends a telephone number specifying a call receiving terminal to the facility of the communication company, the communication terminal also transmits the user-related information to the facility of the communication company, and
    wherein the user-related information includes at least one of information about preference of a user who utilizes the communication terminal, history of information distribution to the user, and position information of the user.

2. The telephone communication system according to claim 1, wherein the communication terminal includes means for storing the user-related information.

3. The telephone communication system according to claim 1 further including an advertiser for providing the piece of advertisement information, wherein the facility of the communication company includes means for obtaining information about achievement of distribution of the piece of advertisement information, and means for billing an advertisement fee calculated on the basis of the information about achievement of distribution to the advertiser.

4. The telephone communication system according to claim 1, wherein the facility of the communication company includes means for changing billing information accumulated as the communication terminal utilizes the telephone network for communication, on the basis of a discount calculated in accordance with the information of achievement of distribution.

5. The telephone communication system according to claim 1, wherein the facility of the communication company includes means for connecting the communication terminal with a second communication terminal via the telephone network, and the retrieving means retrieves the piece of advertisement information when the communication terminal makes a request for connection to the second communication terminal.

6. The telephone communication system according to claim 5, wherein the facility of the communication company also receives second user-related information from the second communication terminal, and transmits a piece of advertisement information retrieved on the basis of the second user-related information to the second communication terminal.

7. The telephone communication system according to claim 1, wherein the communication terminal transmits the user-related information when it makes a request for connection to a second communication terminal.

8. The telephone communication system according to claim 7, wherein the facility of the communication company also receives second user-related information from the second communication terminal, and transmits a piece of advertisement information retrieved on the basis of the second user-related information to the second communication terminal.

9. A method of providing a communication terminal, which is a subscriber of a communication company, with a piece of advertisement information via a telephone network of a facility associated with the communication company when the communication terminal makes a request for connection to a second communication terminal, the method comprising the steps of:
    receiving the connection request from the communication terminal;
    receiving user-related information from the communication terminal, wherein when the communication terminal sends a telephone number specifying a call receiving terminal to the facility of the communication company, the communication terminal also transmits the user-related information to the facility of the communication company;
    retrieving a desired piece of advertisement information from advertisement information storage means designed to store pieces of advertisement information on the basis of the received user-related information, wherein the user-related information includes at least one of information about preference of a user who utilizes the communication terminal, history of information distribution to the user, and position information of the user;
    transmitting the retrieved piece of advertisement information to the communication terminal; and
    connecting the communication terminal with the second communication terminal such that the communication terminal can communicate with the second communication terminal via the telephone network.

10. A server, for use with a communication company adapted to connect a first communication terminal with a second communication terminal via a telephone network, for providing advertisement information, the server comprising:
  means for storing pieces of advertisement information;
  means for obtaining user-related information from the first and/or second communication terminal, wherein the user-related information is obtained during a same time period as when a connection reciuest including a telephone number specifying a call receiving terminal is obtained;
  means for retrieving at least one piece of advertisement information from the storing means on the basis of the user-related information from the first and/or second communication terminal, wherein the user-related information includes at least one of information about preference of a user who utilizes the first and/or second communication terminal, history of information distribution to the user, and position information of the user;
  means for transmitting the retrieved piece of advertisement information to the first and/or second communication terminal; and
  means for connecting the first communication terminal with the second communication terminal via the telephone network.

11. A telephone communication system for providing a communication terminal, which is a subscriber of a communication company, with a piece of advertisement information via a telephone network of a facility associated with by the communication company,
  wherein the communication terminal includes means for transmitting user-related information, means for receiving a list of advertisement information and a piece of advertisement information from the communication company, means for selecting a desired advertisement item from the list of advertisement information, and means for transmitting the selected item as selection information to the communication company,
  wherein the facility of the communication company includes means for storing pieces of advertisement information, means for creating the list of advertisement information on the basis of the pieces of advertisement information stored in the storing means and on the basis of the user-related information from the communication terminal, means for retrieving a desired piece of advertisement information from the storing means, means for receiving the selection information from the communication terminal, and means for transmitting the piece of advertisement information to the communication terminal,
  wherein when the communication terminal sends a telephone number specifying a call receiving terminal to the facility of the communication company, the communication terminal also transmits the user-related information to the facility of the communication company,
  wherein the user-related information is includes at least one of information about preference of a user who utilizes the communication terminal, history of information distribution to the user, and position information of the user, and
  wherein the communication terminal transmits user-related information to the communication company facility, and the advertisement list creating means of the communication company facility creates the list of advertisement information in accordance with the user-related information.

12. The telephone communication system according to claim 11, wherein the retrieving means of the communication company facility retrieves the desired piece of advertisement information in accordance with the selection information transmitted from the communication terminal.

13. The telephone communication system according to claim 1, wherein the user-related information includes the history of information distribution to the user, and the means for transmitting the retrieved piece of advertisement information transmits the retrieved piece of advertisement information to the user based on the history of information distribution.

14. The telephone communication system according to claim 1, wherein the user-related information includes the position information of the user, and the position information of the user is geographical information of the communication terminal.

15. The telephone communication system according to claim 1, wherein the user-related information includes the position information of the user, and the position information of the user is entered by the user.

16. The method according to claim 15 further including the step of not sending the same piece of advertisement information to the same communication terminal within a predetermined period, based on the history of information distribution.

17. The server according to claim 10 further including means for not sending the same piece of advertisement information to the same communication terminal within a predetermined period, based on the history of information distribution.

18. The telephone communication system according to claim 11 further including means for not sending the same piece of advertisement information to the same communication terminal within a predetermined period, based on the history of information distribution.

19. The telephone communication system according to claim 12 further including means for not sending the same piece of advertisement information to the same communication terminal within a predetermined period, based on the history of information distribution.

* * * * *